Patented Sept. 20, 1932

1,878,954

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

PROCESS FOR RENDERING CELLULOSE ACETATE FREE FROM HAZE

No Drawing.   Application filed August 10, 1929.   Serial No. 385,074.

This process relates to a step in the manufacture of cellulose acetate which enables the manufacturer to produce a cellulose acetate exceptionally free from haze.

In the commercial manufacture of cellulose acetate, many types of cellulose are used as raw material for the acetylation. Cellulose obtained from wood, cotton, jute and many other cellulosic materials have been found to have a greater or less degree of utility in the manufacture of this ester of cellulose. In all commercial cellulosic bodies, small amounts of mineral salts are always present, and while an attempt is made to thoroughly remove these and other impurities from the cellulose material, prior to subjecting it to acetylation, it is difficult to extract the last traces of them.

For many commercial uses, the mineral salts and other impurities may be sufficiently extracted from the cellulose by the ordinary pretreating methods, for instance, by an alkali treatment and a subsequent and thorough washing prior to its acetylation. In the production of cellulose acetate, however, which is to be utilized in the manufacture of photographic films, and like transparent objects, it is important that the last traces of these impurities be removed. Even minute quantities of them, when present in the finally produced cellulose ester, may develop a haze which will render the material of little or no use for this purpose.

One of the objects of the present invention is the production of cellulose acetate free from haze. Other objects will hereinafter appear.

I have found that this haze can readily be removed from the cellulose acetate if the finished dope,—that is, the cellulose acetate, which has been hydrolyzed to the desired acetyl content, be treated in the hydrolyzing bath with hydrochloric acid. This added acid appears to react with the mineral salts, such as the metallic sulfates or mixtures of sulfates and phosphates or other organic or inorganic salts which may have been formed by the action of the reagents in the acetylating bath upon the vessel in which the acetylation is effected or which have been present in the cellulosic materials employed. This action of the hydrochloric acid renders these mineral and organic salts more readily water-soluble, whereby, on subsequent precipitation and washing of the cellulose acetate, they are entirely removed from the precipitated cellulose acetate.

It is well known in this art that the addition of a strong hydrochloric acid solution to a cellulose acetate dope will hydrolyze the ester very rapidly from chloroform to acetone solubility, and even farther, with such rapidity that it is next to impossible to control the reaction. It, therefore should be borne in mind that the concentration of the hydrochloric acid should be maintained below the point at which hydrolysis or breaking down of the cellulose acetate results. There are several means whereby this control of the action of the hydrochloric acid may be effected.

One manner of effecting this control is to add the hydrochloric acid at the completion of the usual hydrolysis step and just prior to precipitating the cellulose acetate. Sufficient time, of course, must be allowed for complete dispersion of the hydrochloric acid throughout the hydrolyzing bath or naturally its good effects will not be completely realized. Ordinarily, in the manufacture of batches up to 100 pounds of finished dope, I have found that the addition of hydrochloric acid to the bath about one-half hour prior to precipitation and, during that one-half hour vigorously stirring the mass, allows sufficient time for thorough intermingling of the acid. Furthermore, I have found that generally a concentration of not more than 1% of hydrochloric acid, based on the weight of the reacting solution, will give the desired results in the time indicated. A smaller amount of the hydrochloric acid may be employed, it being necessary, however, to maintain an adequate concentration to render the metallic salts sufficiently soluble. If much more than 1% of hydrochloric is added, the acid appears to deleteriously attack the cellulose ester and otherwise affects the resulting product and it is, therefore, not advisable to increase the concentration greatly above this percentage unless the temperature be sufficiently lowered to render hydrolytic action on the cellulose acetate negligible.

Even with optimum amounts of the added acid, it is desirable to lower the temperature of the hydrolyzing bath prior to the addition of the hydrochloric acid thereto. This lowering of the temperature, of course, decreases the ability of the hydrochloric acid to hydrolyze the cellulose acetate while it does not appear to markedly reduce its interaction with the metallic salts present in the solution, whereby their solubility in water is increased. It is desirable, therefore, to maintain the temperature during this time at or about 20° C. A higher temperature may be employed, especially if smaller batches are used where a thorough dispersion of the hydrochloric acid throughout the mass can be more readily carried out, this preventing any localized overheating of the mass.

The addition of the hydrochloric acid at the beginning of the hydrolysis is objectionable, for while the haze in the solution at first becomes less marked, it will be found that on continued action, to the end of the hydrolysis an increase in haze results so that the finished cellulose acetate is apt to contain more haze than if no hydrochloric acid treatment had been given.

I shall now describe a specific example for the carrying out of my invention, but it will be distinctly understood that I shall not be restricted by the proportions therein given except as is indicated in the appended claims.

To 100 parts of a finished cellulose acetate dope which has been prepared by any of the well known acetylation processes there is added 2 parts of 35% hydrochloric acid which has been diluted with 5 parts of acetic acid. The temperature of the dope is preferably lowered to approximately 20° C., prior to the addition thereto of the hydrochloric acid. After a thorough mixing of the mass for approximately one-half hour, it is precipitated into a 35% to 40% acetic acid-water bath and subsequently washed and dried. The cellulose acetate thus formed, when dissolved in acetone containing suitable plasticizers and coagulated upon a film-forming surface by the evaporation or other removal of the acetone from the dope gives a brilliant, transparent film, entirely free from haze.

Having thus described my invention, what I claim as new and desire to secure by Letters Patent is:

1. In the process of manufacturing cellulose acetate, the step which comprises adding hydrochloric acid to partially hydrolyzed cellulose acetate in the hydrolyzing bath.

2. In the process of manufacturing cellulose acetate, the step which comprises adding an acetic acid solution of hydrochloric acid to partially hydrolyzed cellulose acetate in the hydrolyzing bath.

3. In the process of manufacturing cellulose acetate, the step which comprises adding an acetic acid solution containing approximately 10% of concentrated hydrochloric acid to partially hydrolyzed cellulose acetate in the hydrolyzing bath.

4. In the process of manufacturing cellulose acetate, the step which comprises adding to the partially hydrolyzed cellulose acetate in the hydrolyzing bath approximately 0.7% of hydrochloric acid, based on the weight of the total contents of the hydrolyzing bath.

5. In the process of manufacturing cellulose acetate, the step which comprises adding to 100 parts of a hydrolyzing bath, containing partially hydrolyzed cellulose acetate, 2 parts of 35% hydrochloric acid diluted with 5 parts of acetic acid, whereby a cellulose acetate free from haze is obtained.

6. In the process of manufacturing cellulose acetate, the step which comprises adding to a partially hydrolyzed cellulose acetate in the hydrolyzing bath less than approximately 1% of hydrochloric acid, based on the weight of the total contents of the hydrolyzing bath.

7. In the process of manufacturing cellulose acetate, the step which comprises adding hydrochloric acid to a hydrolysis bath containing cellulose acetate which has been hydrolyzed substantially in said bath.

Signed at Rochester, New York, this 7th day of August, 1929.

CARL J. MALM.